(12) United States Patent
Puppala et al.

(10) Patent No.: US 8,459,659 B2
(45) Date of Patent: Jun. 11, 2013

(54) HYBRID LATHE CHUCK

(75) Inventors: Madhav S. Puppala, Lisle, IL (US); Thomas M. Grobbel, Ortonville, MI (US)

(73) Assignee: Illinois Tool Works Inc., Glenview, IL (US)

( * ) Notice: Subject to any disclaimer, the term of this patent is extended or adjusted under 35 U.S.C. 154(b) by 1300 days.

(21) Appl. No.: 12/205,654

(22) Filed: Sep. 5, 2008

(65) Prior Publication Data

US 2009/0160140 A1 Jun. 25, 2009

Related U.S. Application Data

(60) Provisional application No. 61/014,911, filed on Dec. 19, 2007.

(51) Int. Cl.
*B23B 31/02* (2006.01)

(52) U.S. Cl.
USPC .............................. 279/125; 279/106; 279/157

(58) Field of Classification Search
USPC .................................. 279/125, 157, 158, 106
IPC ........................................................ B23B 31/02
See application file for complete search history.

(56) References Cited

U.S. PATENT DOCUMENTS

| | | | | |
|---|---|---|---|---|
| 2,538,521 A | * | 1/1951 | Huntting | 279/116 |
| 2,711,904 A | * | 6/1955 | Gartner et al. | 279/46.9 |
| 3,685,843 A | * | 8/1972 | Jacyno | 408/239 R |
| 3,904,214 A | * | 9/1975 | Manchester | 279/4.11 |
| 3,910,589 A | * | 10/1975 | Derbyshire | 279/61 |
| 3,949,998 A | * | 4/1976 | Dietzen et al. | 279/62 |
| 3,963,249 A | * | 6/1976 | Fink | 279/157 |
| 4,051,655 A | | 10/1977 | Lorenz et al. | |
| 4,387,905 A | * | 6/1983 | Brown | 279/130 |
| 4,519,621 A | * | 5/1985 | Okamoto | 279/116 |
| 4,553,765 A | * | 11/1985 | Negoro | 279/157 |
| 4,624,466 A | | 11/1986 | Steinberger | |
| 4,648,170 A | | 3/1987 | Kempken et al. | |
| 4,700,957 A | | 10/1987 | Kempken et al. | |
| 4,781,390 A | | 11/1988 | Steinberger et al. | |
| 4,852,434 A | | 8/1989 | Bald | |
| 5,060,957 A | | 10/1991 | Stolzenberg et al. | |
| 5,129,662 A | | 7/1992 | Kempken | |
| 5,197,748 A | * | 3/1993 | Wu | 279/4.12 |
| 5,409,243 A | * | 4/1995 | Shadeck et al. | 279/157 |

(Continued)

FOREIGN PATENT DOCUMENTS

| | | |
|---|---|---|
| DE | 3528943 | 1/1987 |
| EP | 1101554 | 5/2001 |

(Continued)

OTHER PUBLICATIONS

Canadian Office Action communication for application No. 2,700,621, dated Nov. 20, 2012, 3 pages.

Primary Examiner — Eric A Gates
(74) Attorney, Agent, or Firm — Fletcher Yoder P.C.

(57) ABSTRACT

A system, in certain embodiments, includes a cutting tool, a drive, and a chuck rotatable by the drive. The chuck includes a body having a core disposed in a shell, wherein the shell is made of a metal and the core is made of a composite material. The chuck also includes a set of jaws coupled to the body, wherein the jaws are configured to hold a work piece adjacent the cutting tool.

22 Claims, 12 Drawing Sheets

U.S. PATENT DOCUMENTS

| | | | |
|---|---|---|---|
| 5,735,535 A * | 4/1998 | McCombs et al. | 279/131 |
| 5,816,585 A * | 10/1998 | Schenk | 279/125 |
| 5,829,761 A | 11/1998 | Rohm | |
| 5,842,703 A | 12/1998 | Antoni | |
| 5,846,036 A * | 12/1998 | Mizoguchi | 409/134 |
| 5,890,720 A | 4/1999 | Antoni | |
| 5,951,025 A | 9/1999 | Bohler | |
| 5,954,320 A | 9/1999 | Bohler | |
| 5,975,511 A | 11/1999 | Bohler | |
| 6,073,940 A * | 6/2000 | Tabachenko et al. | 279/157 |
| 6,425,584 B1 | 7/2002 | Stickney | |
| 6,601,856 B2 | 8/2003 | Bohler | |
| 6,629,355 B2 * | 10/2003 | Murata et al. | 29/563 |
| 6,637,307 B2 | 10/2003 | Bohler | |
| 6,655,699 B2 | 12/2003 | Grobbel | |
| 6,746,024 B2 | 6/2004 | Bohler | |
| 6,913,268 B2 | 7/2005 | Bohler | |
| 7,192,634 B2 * | 3/2007 | Carter et al. | 428/113 |
| 7,497,444 B2 | 3/2009 | Sakamaki et al. | |
| 7,594,665 B2 * | 9/2009 | Crowley et al. | 279/109 |
| 2005/0281999 A1 * | 12/2005 | Hofmann et al. | 428/304.4 |
| 2007/0210537 A1 | 9/2007 | Weller | |
| 2008/0203681 A1 | 8/2008 | Crowley et al. | |

FOREIGN PATENT DOCUMENTS

| | | |
|---|---|---|
| EP | 1157767 | 11/2001 |
| GB | 848551 | 9/1960 |
| GB | 2333254 | 7/1999 |
| JP | 11070402 | 3/1999 |

* cited by examiner

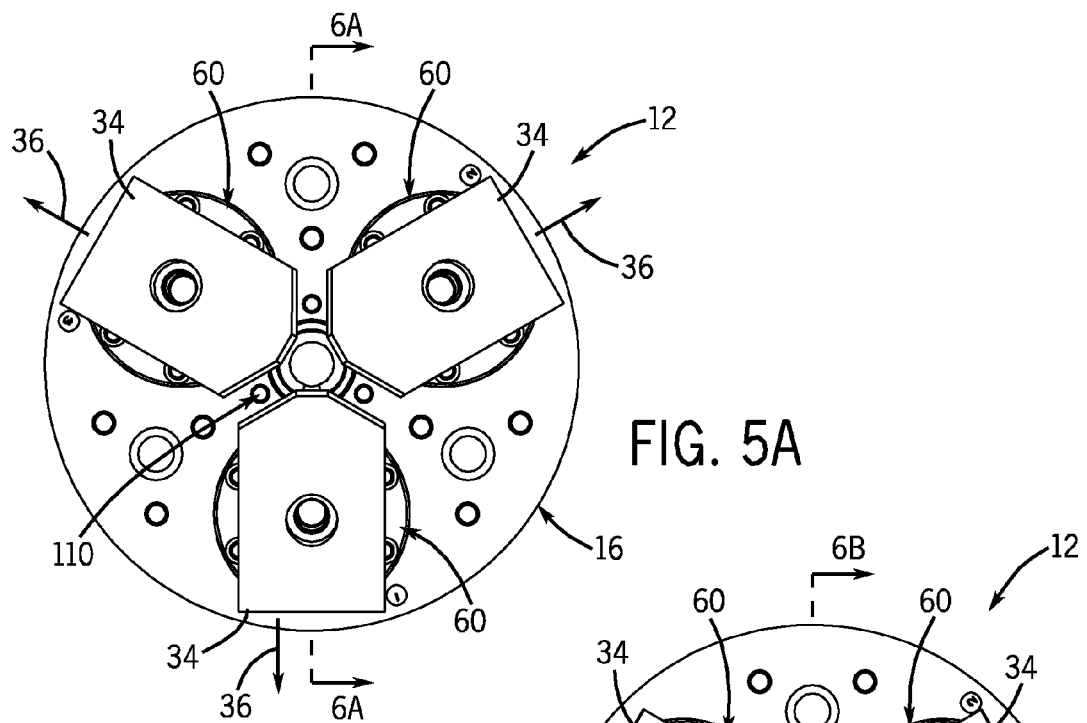
FIG. 5A
FIG. 5B
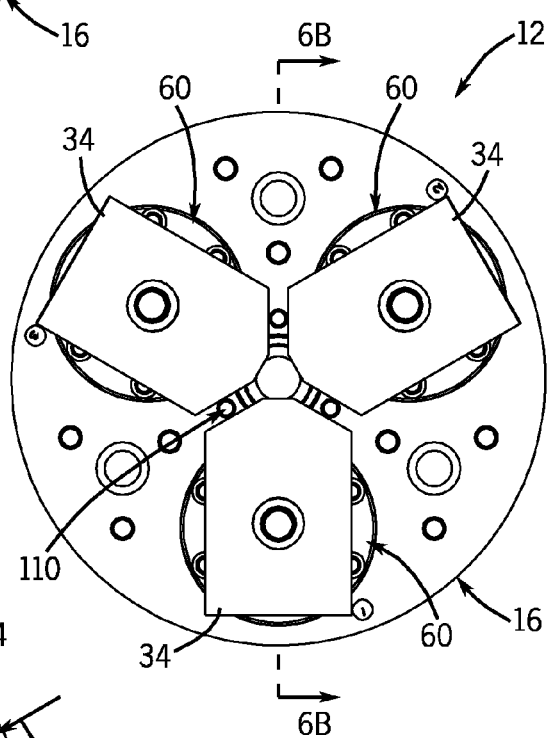
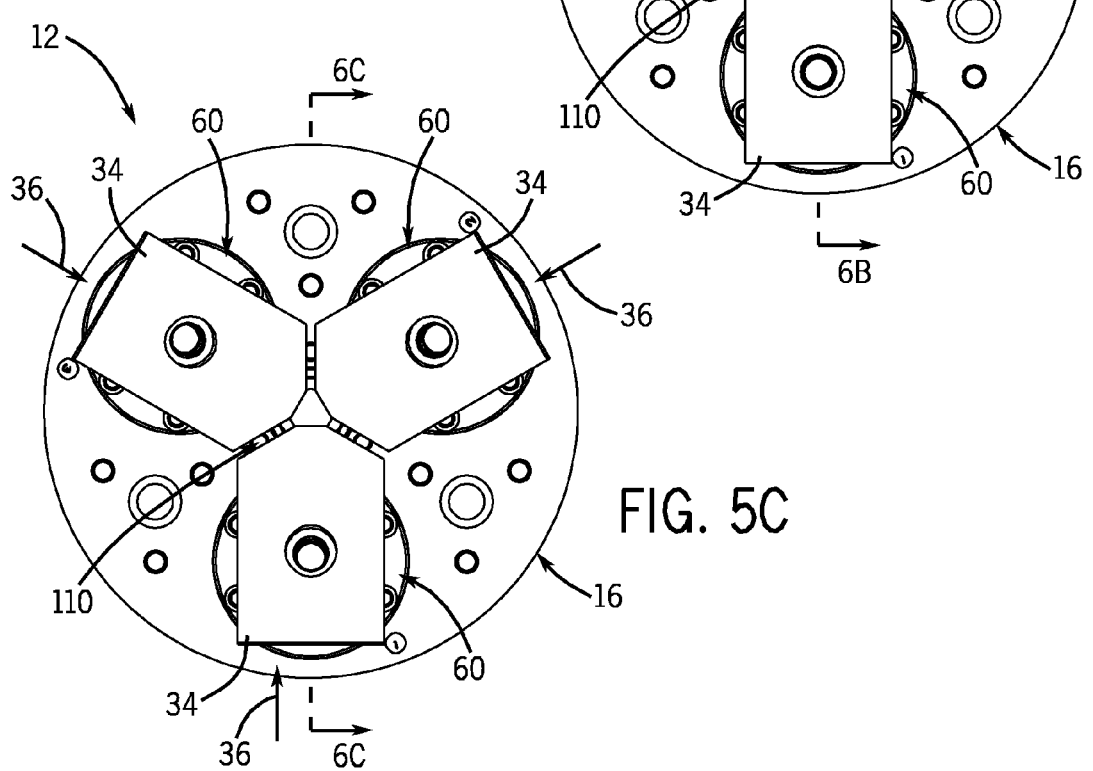
FIG. 5C

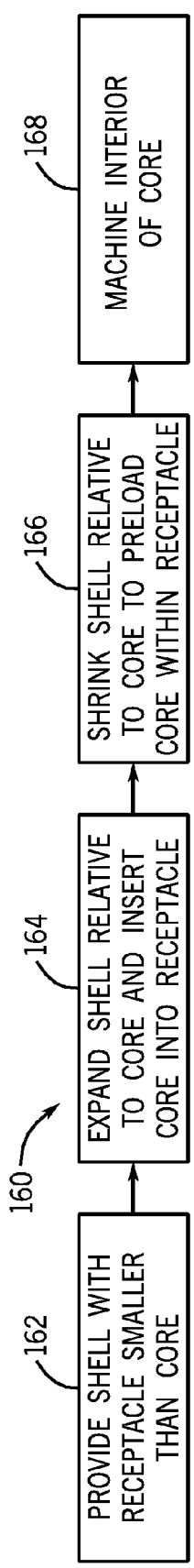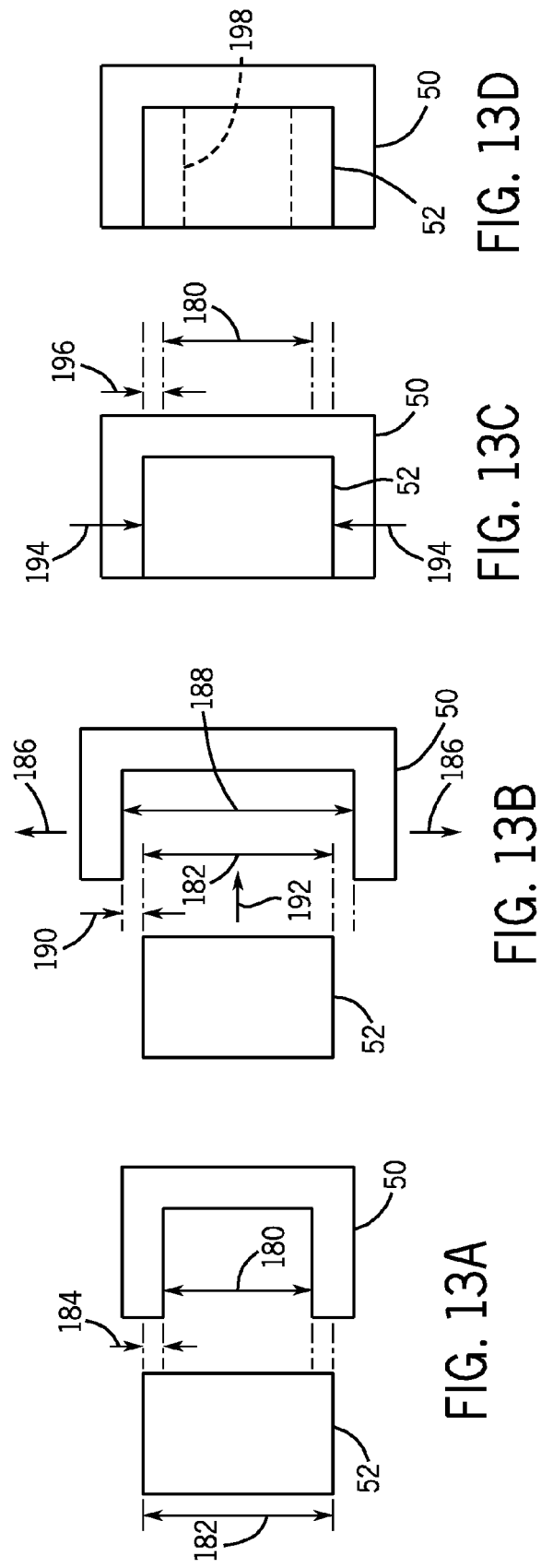

HYBRID LATHE CHUCK

CROSS REFERENCE TO RELATED APPLICATION

This application is a Non-Provisional Patent Application of U.S. Provisional Patent Application No. 61/014,911 entitled "Hybrid Lathe Chuck," which is herein incorporated by reference in its entirety.

BACKGROUND

The invention relates generally to a chuck for use in rotating equipment, such as a lathe.

A chuck typically rotates in response to a rotary drive, such as an electric motor. In large equipment, such as a stationary lathe, the chuck is quite massive. In general, the chuck has an all-steel body to resist the erosive nature of material cut and projected away from a work piece. Unfortunately, the all-steel body requires a considerable amount of torque to turn the chuck and, also, a considerable amount of time to accelerate the chuck up to the desired speed. As a result, the equipment may utilize a relatively larger motor, at a higher cost, to increase the torque and improve the response time. Otherwise, with a smaller motor, the equipment may simply have a lower response time, which results in an overall increase in the time for any given process with the equipment. Thus, the all-steel body results in a tradeoff between cost and performance.

BRIEF DESCRIPTION

A system, in certain embodiments, includes a cutting tool, a drive, and a chuck rotatable by the drive. The chuck includes a body having a core disposed in a shell, wherein the shell is made of a metal and the core is made of a composite material. The chuck also includes a set of jaws coupled to the body, wherein the jaws are configured to hold a work piece adjacent the cutting tool.

DRAWINGS

These and other features, aspects, and advantages of the present invention will become better understood when the following detailed description is read with reference to the accompanying drawings in which like characters represent like parts throughout the drawings, wherein.

Figure 1:
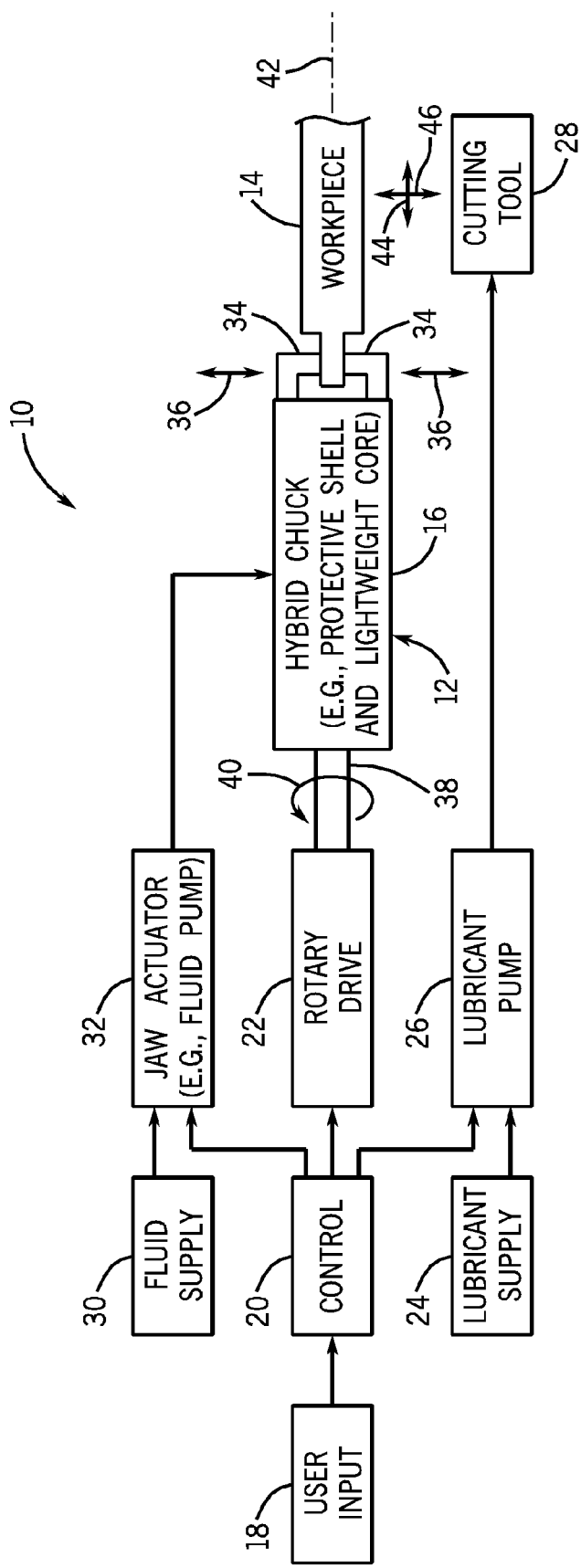
FIG. 1 is a block diagram of an embodiment of a system having a hybrid chuck with a protective shell disposed about a lightweight core.
Figure 6A:
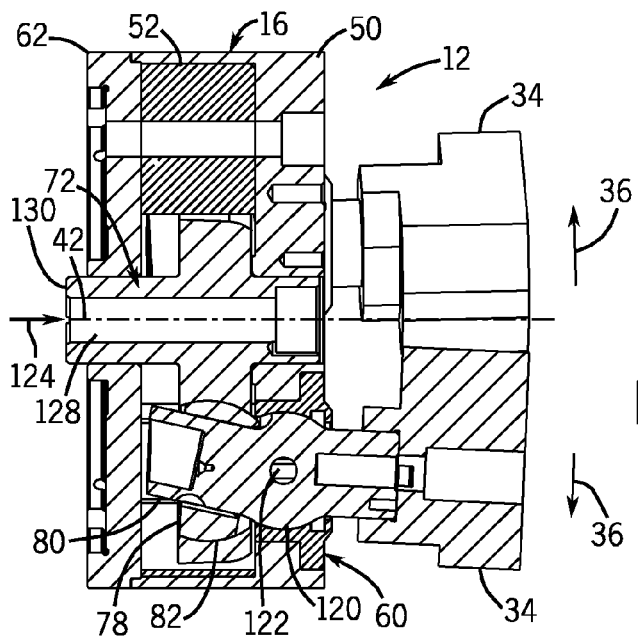
Figure 6B:
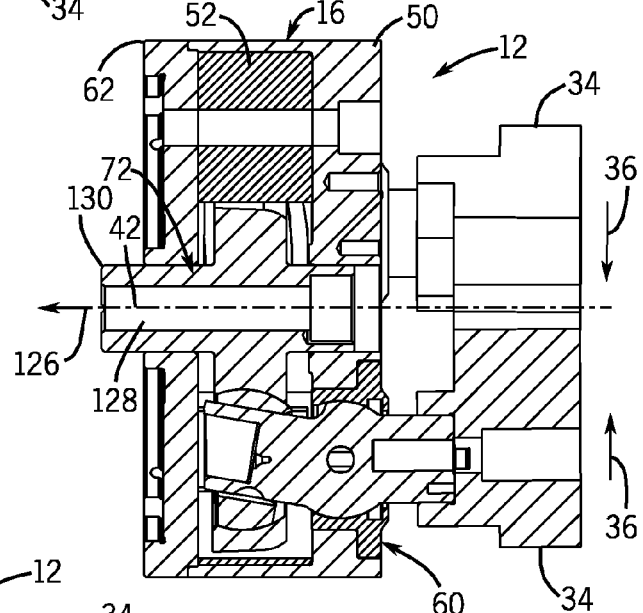
Figure 6C:
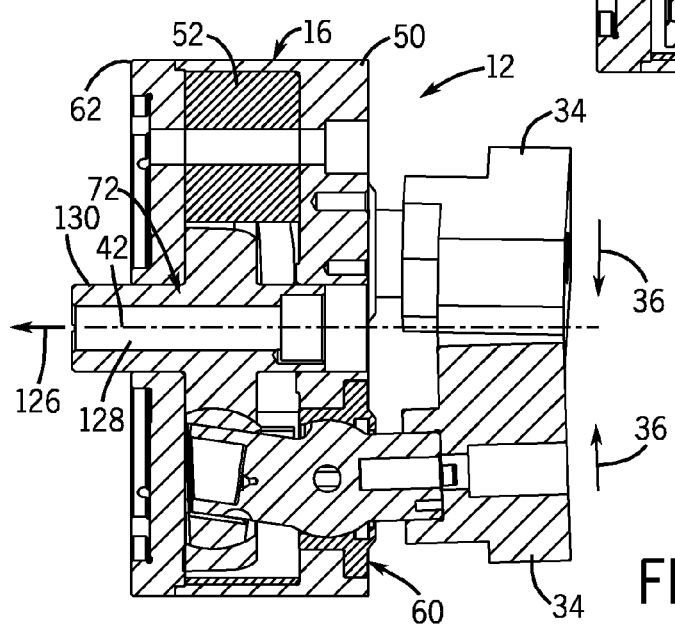
Figure 7:
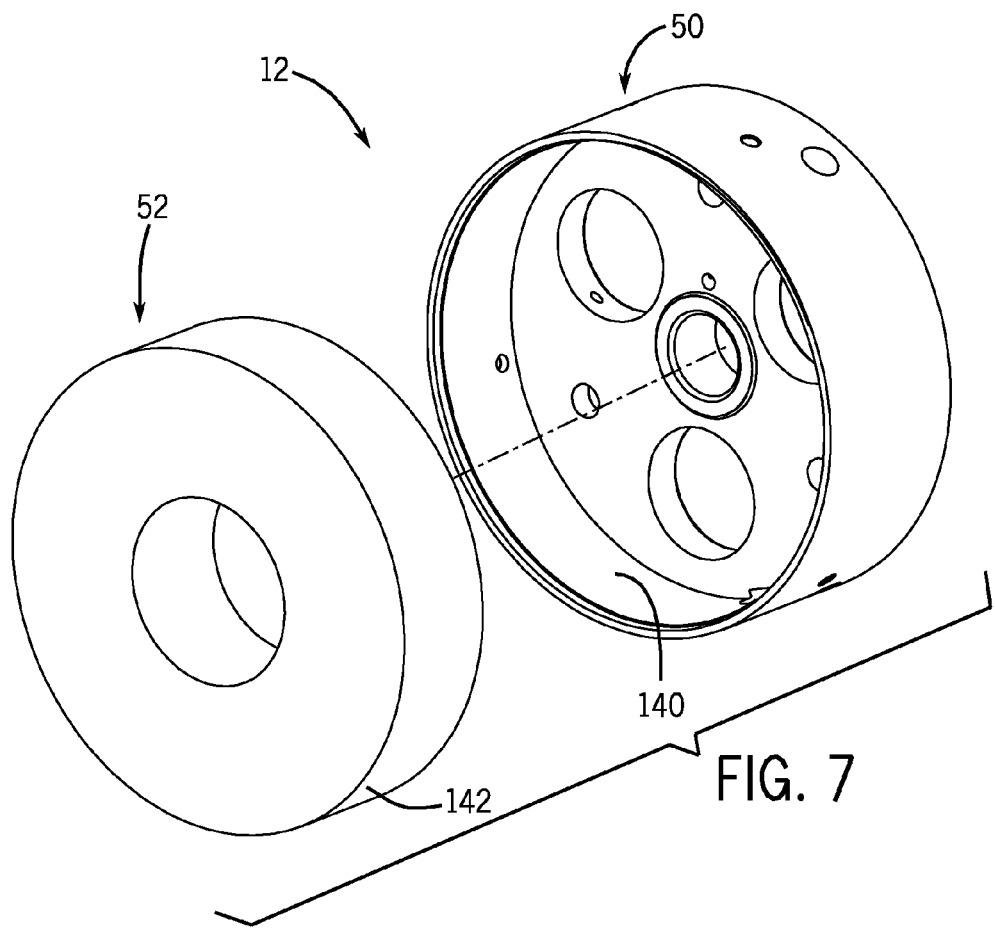
Figure 8:
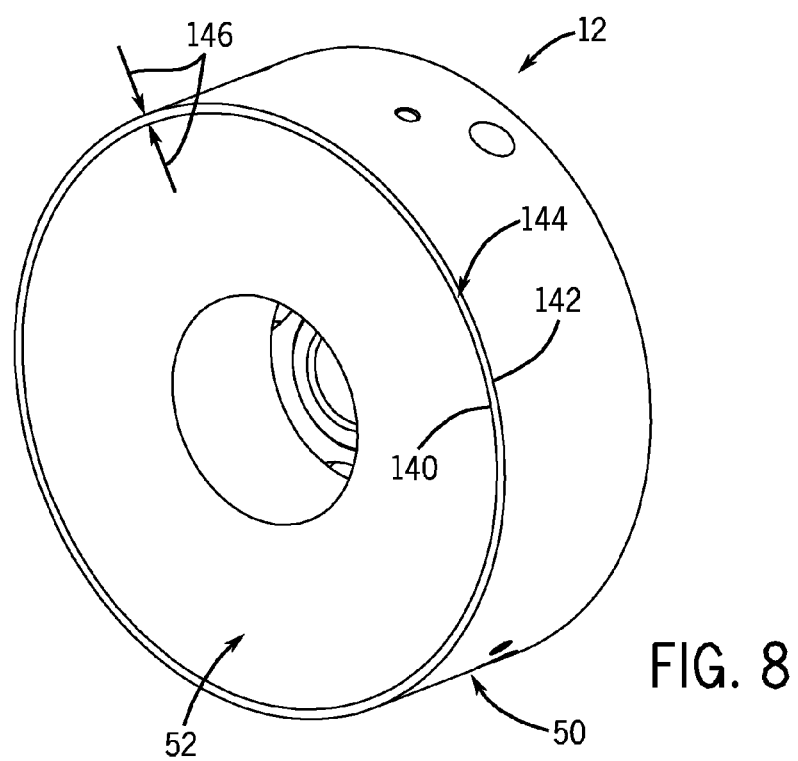
Figure 9:
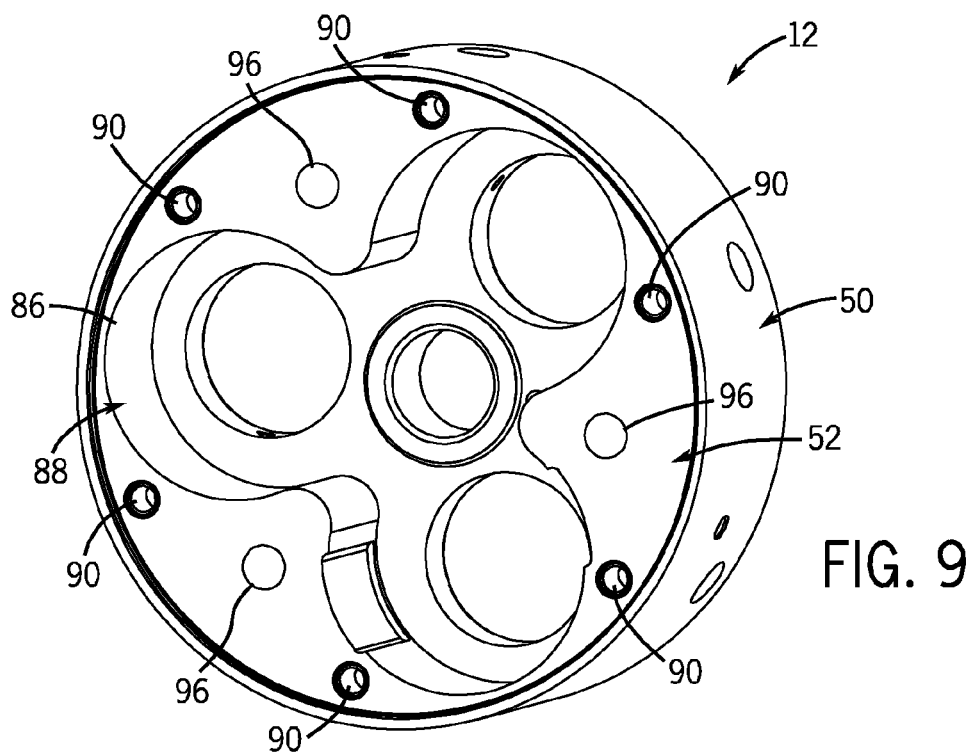
Figure 10:
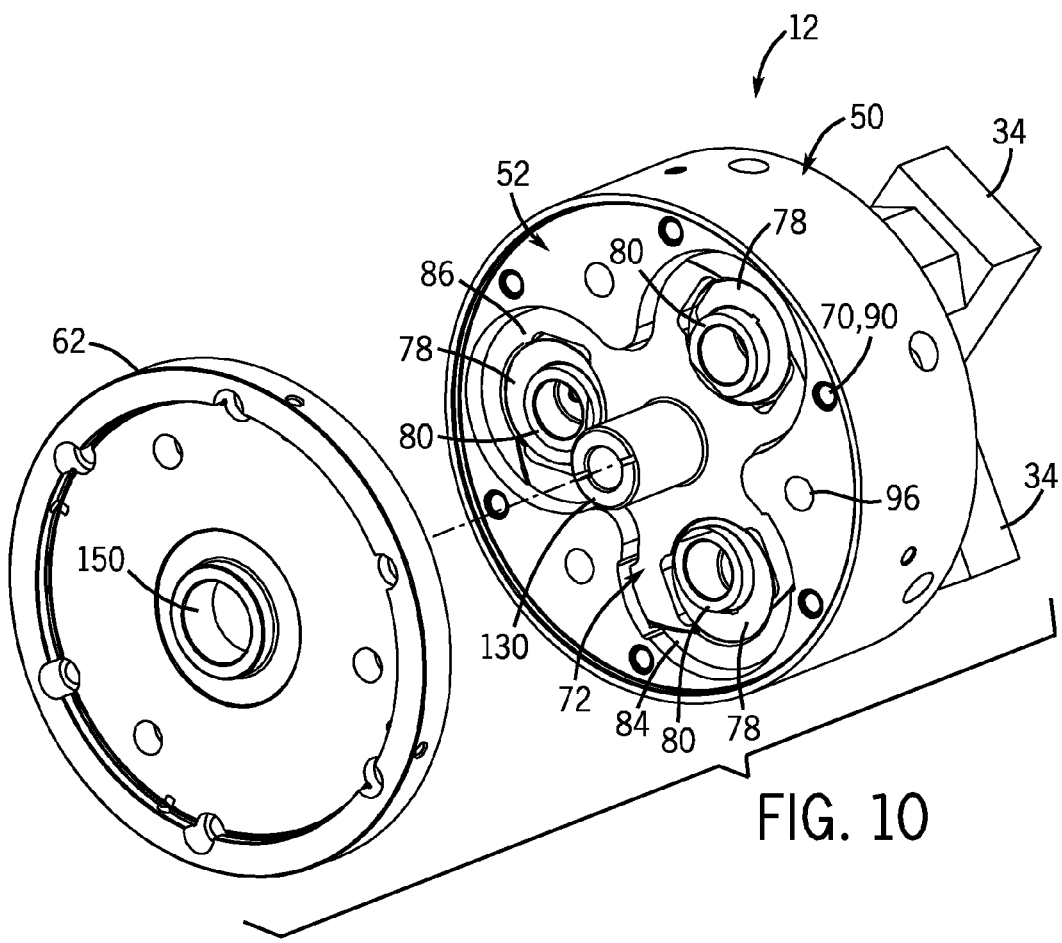
Figure 11:
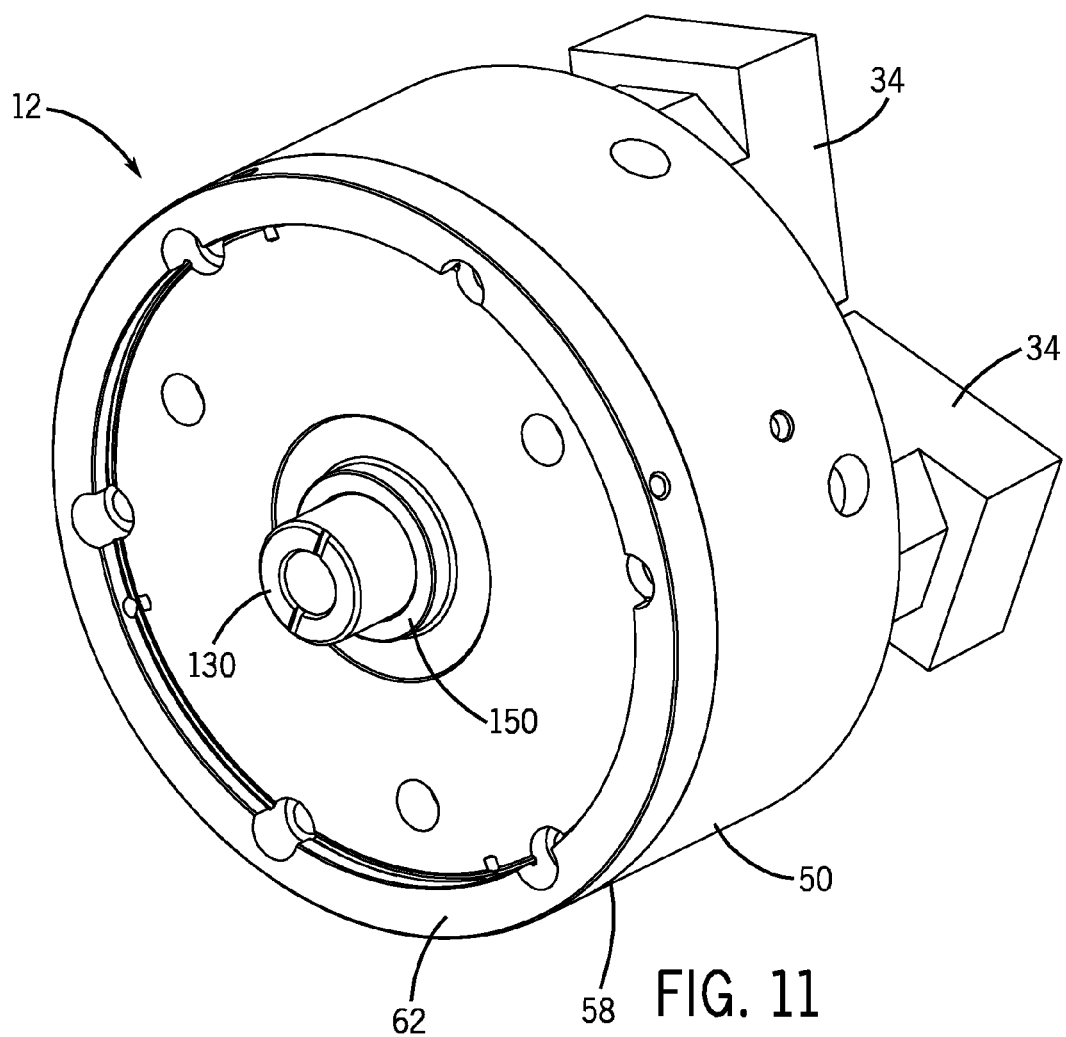
Figure 14A:
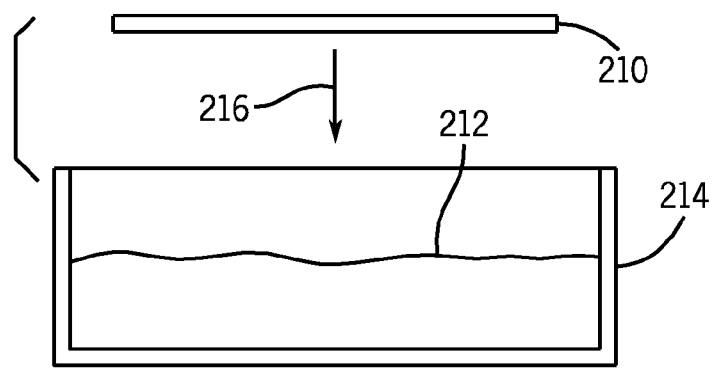
Figure 14B:
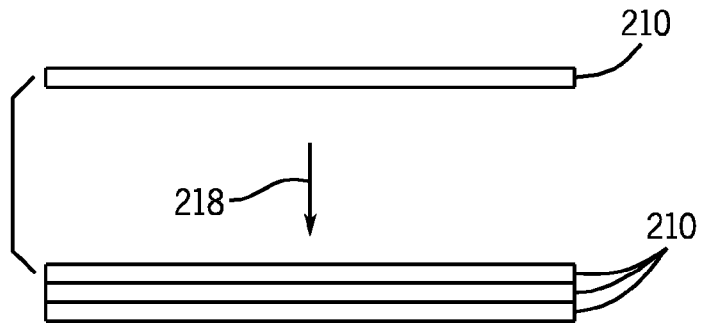
Figure 14C:
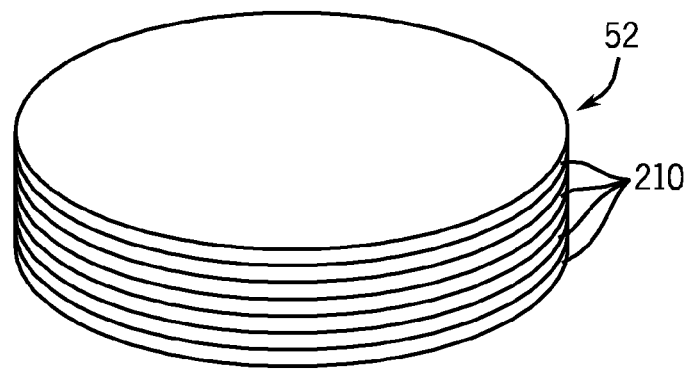
Figure 15:
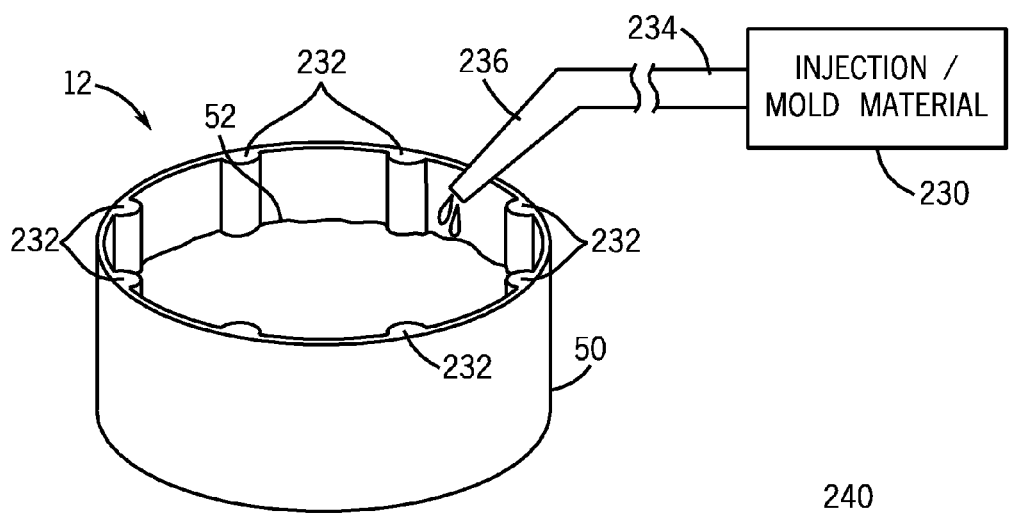
Figure 16:
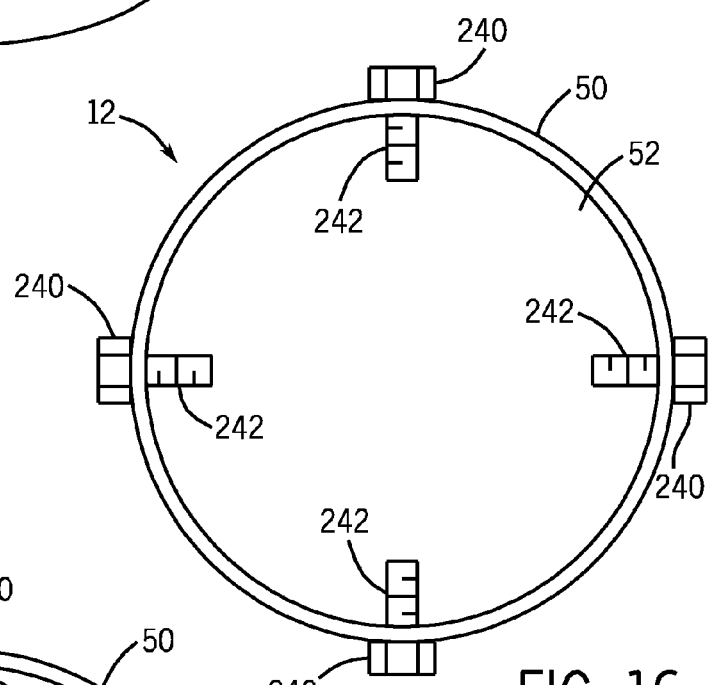
Figure 17:
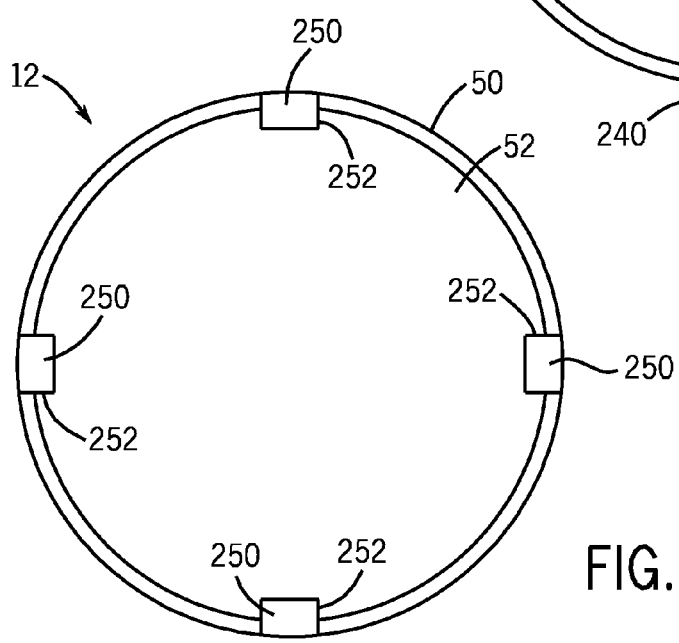

FIGS. 5A, 5B, and 5C are front views of an embodiment of the hybrid chuck as illustrated in FIG. 1, further illustrating an open position, an operating position, and a closed position of a set of three jaws;

FIGS. 6A, 6B, and 6C are cross-sections of an embodiment of the hybrid chuck taken along line 6A-6A of FIG. 5A, line 6B-6B of FIG. 5B, and line 6C-6C of FIG. 5C, respectively;

FIG. 7 is an exploded rear perspective view of an embodiment of the hybrid chuck as illustrated in FIG. 1, illustrating the lightweight core exploded from the protective shell;

FIG. 8 is a rear perspective view of an embodiment of the hybrid chuck as illustrated in FIG. 1, illustrating the protective shell shrink fit about the lightweight core;

FIG. 9 is a rear perspective view of an embodiment of the hybrid chuck as illustrated in FIG. 1, illustrating the lightweight core with internally machined features;

FIG. 10 is a rear perspective view of an embodiment of the hybrid chuck as illustrated in FIG. 1, illustrating an assembly of components within the internally machined features, and illustrating a rear plate exploded from the assembly;

FIG. 11 is a rear perspective view of an embodiment of the hybrid chuck as illustrated in FIG. 1, illustrating the rear plate attached to the assembly;

FIG. 12 is a flowchart illustrating an embodiment of a process for manufacturing the hybrid chuck as illustrated in FIG. 1;

FIGS. 13A, 13B, 13C, and 13D are schematics of an embodiment for manufacturing the hybrid chuck as illustrated in FIG. 1;

FIGS. 14A, 14B, and 14C are schematics of an embodiment for manufacturing a composite lightweight core of the hybrid chuck as illustrated in FIG. 1;

FIG. 15 is a schematic of an embodiment for injection molding the lightweight core into the protective shell of the hybrid chuck as illustrated in FIG. 1;

FIG. 16 is a schematic of an embodiment utilizing bolts to mechanically secure the protective shell to the lightweight core of the hybrid chuck as illustrated in FIG. 1; and FIG. 17 is a schematic of an embodiment utilizing a set of keys and slots to mechanically secure the protective shell to the lightweight core of the hybrid chuck as illustrated in FIG. 1.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, various embodiments of a hybrid chuck 12 avoid an all-steel construction in favor of a multi-material construction using both lightweight materials and erosion resistant materials. As discussed above, the hybrid chuck 12 is often exposed to erosion by chips of a work piece 14. Thus, embodiments of the hybrid chuck 12 employ an erosion resistant material along surfaces exposed to such erosion, while employing lightweight materials in areas less likely to undergo erosion. Although the following discussion may refer to specific embodiments, the hybrid chuck 12 is not limited to any particular manufacturing techniques, materials, product designs, or equipment. Thus, the hybrid chuck 12 is intended for use in a variety of tools and equipment, including stationary equipment, portable equipment, hand-tools, and so forth.

FIG. 1 is a block diagram of an embodiment of a system 10 utilizing a hybrid chuck 12 to secure a work piece 14. As discussed in detailed below, the hybrid chuck 12 has a body 16 made of at least two dissimilar materials, such as a metal, a plastic, an epoxy, a composite, or a combination thereof. In particular, the body 16 is designed to reduce weight while maintaining external protection against the working environment. For example, an embodiment of the body 16 includes a protective shell 50 disposed about a lightweight core 52 (see FIGS. 2-11). The protective shell 50 is configured to resist erosion by flying chips during a cutting operation or the like. The lightweight core 52 is configured to reduce the specific weight of the overall body 16, such that the hybrid chuck 12 can be more rapidly rotated up to speed. In one embodiment, the body 16 of the hybrid chuck 12 includes a metallic annular protective shell 50 shrink fit about a generally cylindrical composite core 52.

As discussed in further detail below, the hybrid chuck 12 may be made with a variety of materials, connections, shapes, and designs. For example, the protective shell 50 may be made out of a variety of erosion resistant materials, such as metals, alloys, etc. The lightweight core 52 may be made out of a variety of lightweight materials, such as plastics, epoxies, composites, and so forth. In one embodiment, the protective shell 50 is made of stainless steel, and the lightweight core 52 is made out of a composite material including fibers or particles in a plastic binder, e.g., glass fibers in an epoxy binder. For example, the composite material may include layers of glass fiber woven fabric impregnated with an epoxy resin binder, e.g., fabric dipped in epoxy and stacked one over another. One such composite material is a NEMA Grade G10 glass reinforced epoxy. The composite material also may include a fire retardant, e.g., a NEMA Grade FR4 fire retardant. In one embodiment, the lightweight core 52 is made of a G10-FR4 composite, a G11-FR5 composite, or another suitable composite material. These composite materials exhibit high strength, superior adhesive properties, and great dimensional stability. The dimensional stability is particularly useful for machining and maintaining tight tolerances. The hybrid chuck 12 also may include a rear cover 62 (see FIGS. 2-11) made out of a lightweight material with some erosion resistance, e.g., aluminum. Furthermore, as discussed in detail below, the protective shell 50 may be secured to the lightweight core 52 via a chemical bond, a mechanical bond or coupling, or a combination thereof. For example, the chemical bond may include an adhesive, such as an epoxy, between the protective shell 50 and the lightweight core 52. The mechanical bond or coupling may include a shrink fit with or without a resulting pre-load, a clamping mechanism, a bolt, a key in slot mating connection, a male/female geometrical connection, or any combination thereof. Additional details and embodiments of the hybrid chuck 12 are discussed below with reference to FIGS. 2-17.

As illustrated in FIG. 1, the system 10 includes a user input 18, a control 20, a rotary drive 22 (e.g., an electric motor), a lubricant supply 24, a lubricant pump 26, a cutting tool 28, a fluid supply 30, and a jaw actuator 32 (e.g., a fluid pump). In certain embodiments, the hybrid chuck 12 includes a plurality of jaws 34 configured to expand and contract as indicated by arrows 36, thereby opening and closing onto the work piece 14. The rotary drive 22 couples to the hybrid chuck 12 via a shaft 38 or another suitable connection to enable rotation as indicated by arrow 40. Thus, the rotary drive 22 provides torque to rotate the hybrid chuck 12, thereby rotating the work piece 14 held by the plurality of jaws 34. Again, as noted above and discussed further below, the body 16 of the hybrid chuck 12 may include a protective shell disposed about a lightweight core, such that the body 16 has a lower specific weight while maintaining external protection. Thus, the lower specific weight of the body 16 enables the rotary drive 22 to more rapidly accelerate the hybrid chuck 12 up to a desired speed, thereby reducing operational time for a particular procedure. Moreover, the lower specific weight of the body 16 may enable use of a smaller motor for the rotary drive 22, thereby reducing costs associated with the system 10.

The illustrated control 20 is configured to control the rotary drive 22, the lubricant pump 26, the cutting tool 28, and the jaw actuator 32 via pre-set controls and/or the user input 18. For example, the control 20 may control the cutting tool 28 to move lengthwise along an axis 42 as indicted by arrow 44, radially inward and outward relative to the axis 42 as indicated by arrow 46, or a combination thereof. The cutting tool 28 may include a variety of blades, such as a lathe cutting tool. In addition, the control 20 may control the lubricant pump 26 to provide lubricant from the lubricant supply 24 to the cutting tool 28, the work piece 14, or a combination thereof. The control 20 also may control the jaw actuator 32 to expand and contract the plurality of jaws 34 as indicated by arrows 36. In one embodiment, the jaw actuator 32 is a fluid pump, such as a hydraulic pump, which provides fluid from the fluid supply 30 to a fluid driven mechanism within the hybrid chuck 12 to actuate the opening and closing of the jaws 34. However, any suitable actuation mechanism may be used for opening and closing the jaws 34.

Figure 2:
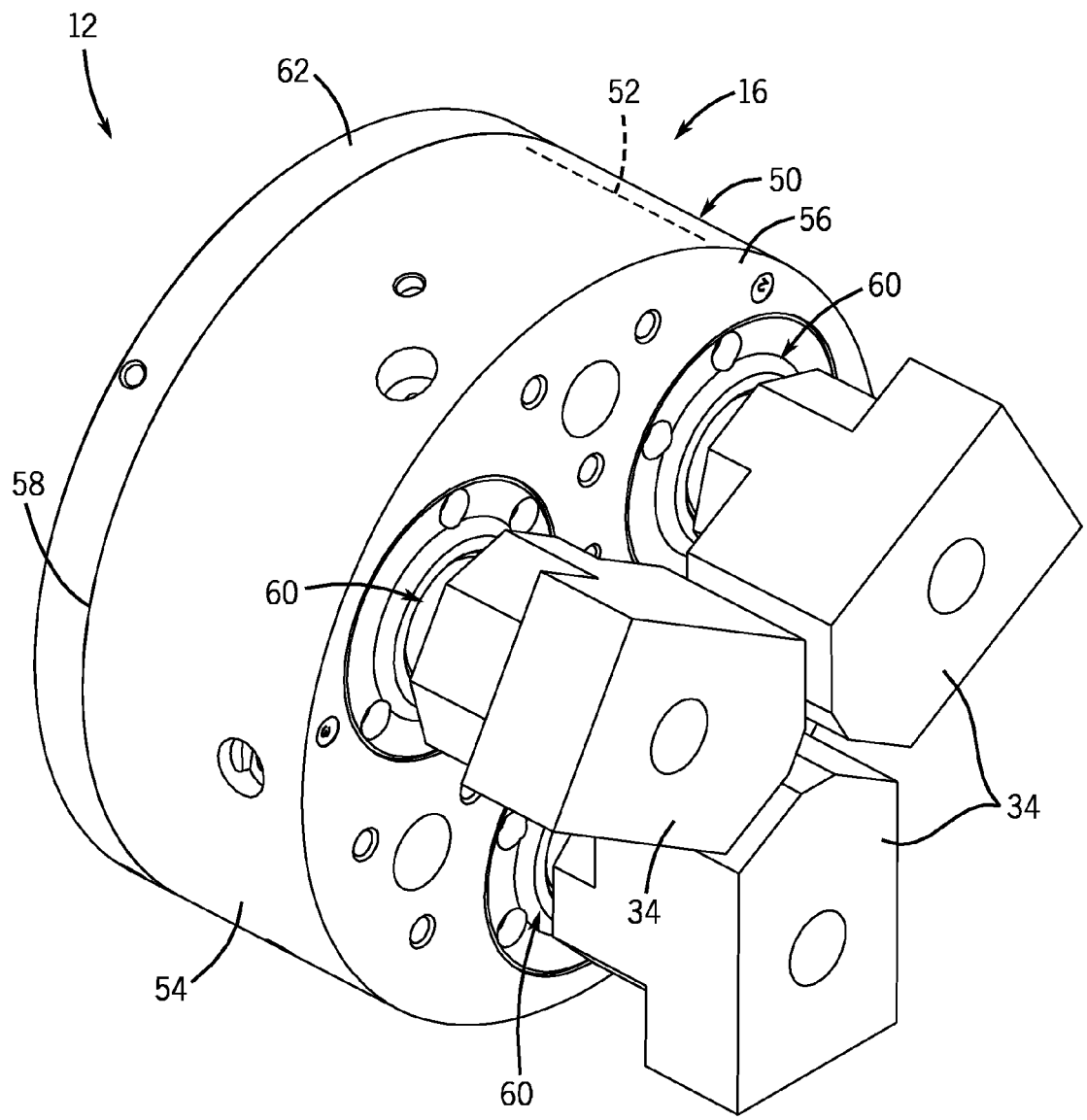
FIG. 2 is a front perspective view of an embodiment of the hybrid chuck as illustrated in FIG. 1.

FIG. 2 is a front perspective view of an embodiment of the hybrid chuck 12 as illustrated in FIG. 1. In the illustrated embodiment, the body 16 has a protective shell 50 disposed about a lightweight core 52, such that the body 16 maintains external protection while reducing the specific weight of the hybrid chuck 12. The protective shell 50 includes an annular sidewall 54, a front wall 56, and an opposite rear opening 58. A set of three jaws 34 pivotally couple to the front wall 56 of the body 16 via corresponding joint assemblies 60. In certain embodiments, the joint assemblies 60 may enable translation in the radial direction, translation in the axial direction, or rotation about multiple axes. For example, the illustrated embodiment of the joint assembly 60 enables rotation of the jaws 34 in a pivoting motion inwardly and outwardly relative to one another and the axis 42.

The hybrid chuck 12 also may include a rear cover 62 disposed over the rear opening 58 of the protective shell 50. In certain embodiments, the rear cover 62 may be made from the same material as the protective shell 50, the same material as the lightweight core 52, or a combination thereof. In other embodiments, the rear cover 62 may be made from a material different from both the protective shell 50 and the lightweight core 52. For example, the rear cover 62 may have a hardness, specific weight, and/or density intermediate the material construction of the protective shell 50 and the lightweight core 52. In one embodiment, the protective shell 50 may be made of a stainless steel, the rear cover 62 may be made of aluminum, and the lightweight core 52 may be made of a non-metallic material, a plastic, an epoxy, a composite material, or a combination thereof. As appreciated, the protective shell 50 has the annular side wall 54 and the front wall 56 in closer proximity to the work piece 14, the cutting tool 28, and flying chips from a cutting operation. As a result, the annular side wall 54 and the front wall 56 are more susceptible to erosion by the flying chips from the cutting operation, while the rear cover 62 is less susceptible to erosion by the flying chips.

Accordingly, the rear cover 62 may be made from a protective material, such as aluminum, to provide some external erosion protection at a much lesser weight than the protective shell 50.

Figure 3:
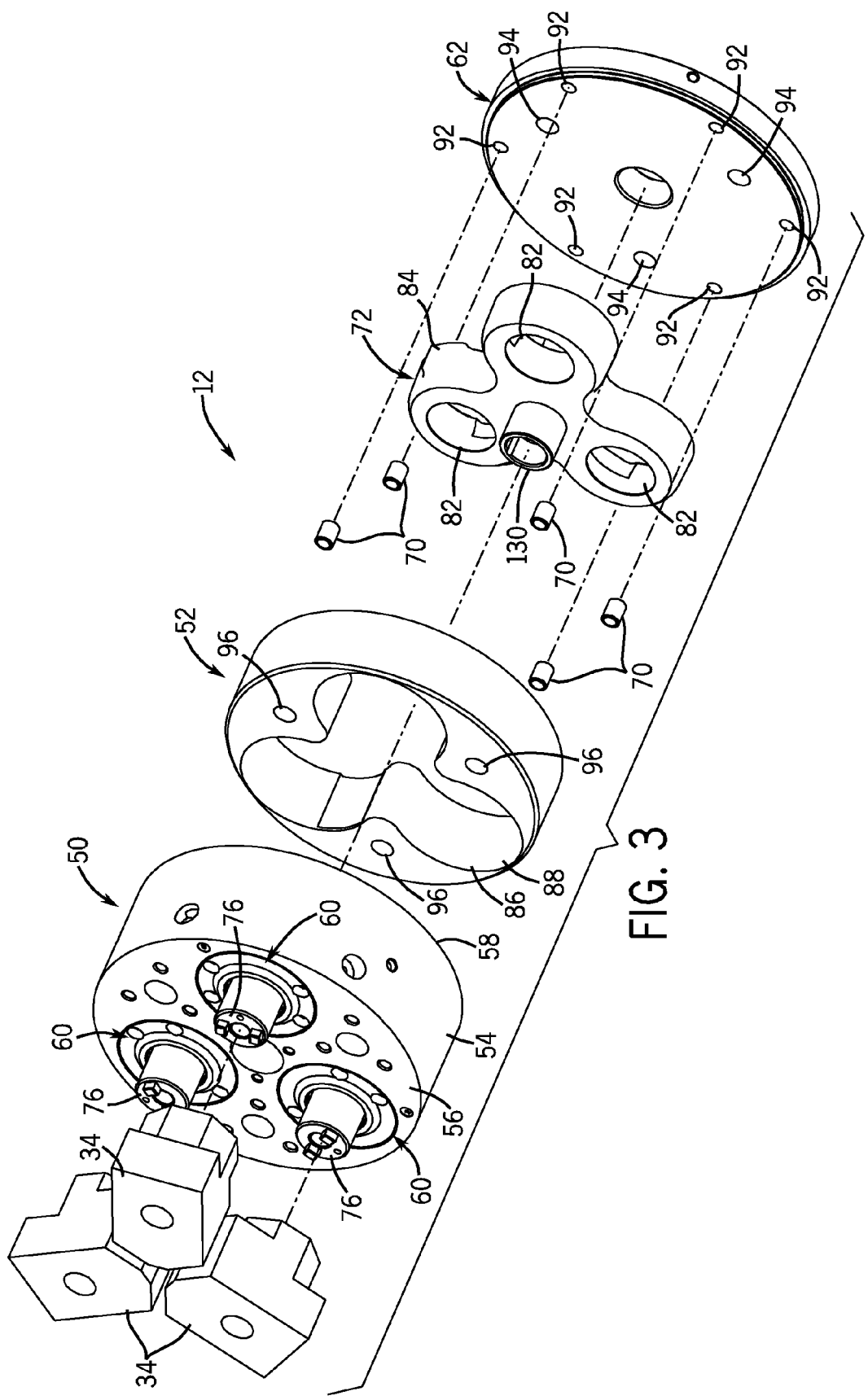
FIG. 3 is an exploded front perspective view of an embodiment of the hybrid chuck as illustrated in FIG. 1.
Figure 4:
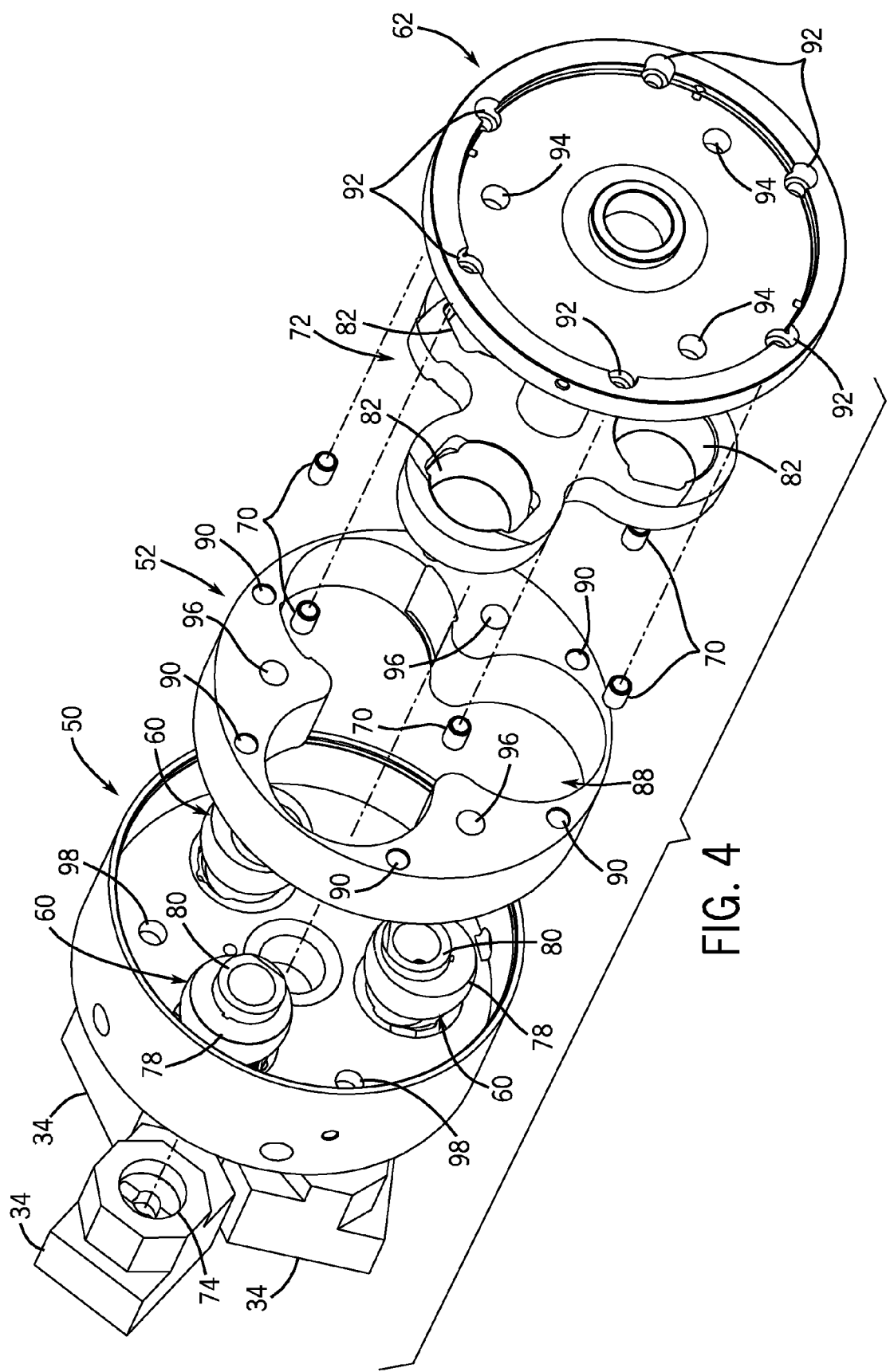
FIG. 4 is an exploded rear perspective view of an embodiment of the hybrid chuck as illustrated in FIG. 1.

FIGS. 3 and 4 are exploded perspective views of an embodiment of the hybrid chuck 12 as illustrated in FIGS. 1 and 2. As discussed in detail below, the protective shell 50 and the lightweight core 52 may be coupled together via a shrink fit, an adhesive, a mechanical fastener, a direct injection molding, or a combination thereof. Thus, the exploded views of FIGS. 3 and 4 are intended only to show the interrelationship between components of the hybrid chuck 12. In the illustrated embodiment, the hybrid chuck 12 includes the set of three jaws 34, the protective shell 50 with the set of three joint assemblies 60, the lightweight core 52, a set of six threaded bushings 70, an actuator plate 72, and the rear cover 62 in an exploded arrangement relative to one another. The jaws 34 each include a mount receptacle or joint coupling 74, which is configured to connect with a corresponding mount post or jaw coupling 76 on each respective joint assembly 60.

Opposite from the jaws 34, each joint assembly 60 includes a ball joint 78 disposed about a guide post 80. As discussed further below, the ball joint 70 is configured to slide along the guide post 80 to pivot the respective jaw 34 in the radial inward and outward directions 36 as illustrated in FIG. 1. The ball joints 78 are configured to mount within corresponding joint receptacles 82 in the actuator plate 72. The joint receptacles 82 hold the ball joints 78 within the actuator plate 72, such that the actuator plate 72 can translate along the axis 42 to cause movement of the ball joints 78 along the guide posts 80.

The actuator plate 72 has a cloverleaf shaped body 84, which is configured to fit within a corresponding cloverleaf shaped receptacle 86 of an actuator support 88 within the lightweight core 52. Thus, the lightweight core 52 fits within the annular side wall 54 of the protective shell 50, the actuator plate 72 fits within the actuator support 88 of the lightweight core 52, and the set of three ball joints 78 fit within the set of three joint receptacles 82 in the actuator plate 72. As discussed further below, the cloverleaf receptacle 86 has a greater axial length than the cloverleaf body 84, thereby enabling axial movement of the actuator plate 72 within the lightweight core 52 after assembly into the protective shell 50. This range of axial movement enables the actuator plate 72 to actuate the jaws 34 via rotation of the joint assemblies 60.

The hybrid chuck 12 also includes a plurality of mounting features to secure the components to one another and also to the rotary drive 22. For example, the lightweight core 52 includes a set of six bushing receptacles 90 configured to receive corresponding threaded bushings 70, which in turn align with bolt receptacles 92 in the rear cover 62. Thus, the rear cover 62 may be bolted to the lightweight core 52 by securing bolts through the bolt receptacles 92 and into the threaded bushings 70 secured within the lightweight core 52. As discussed in further detail below, the lightweight core 52 may be secured within the protective shell 50 via a shrink fit, a chemical bond (e.g., an adhesive), a mechanical bond or connector (e.g., a bolt, a slot and key, a radial protrusion, etc.), or a combination thereof.

The entire hybrid chuck 12 may be secured to the rotary drive 22 or another portion of the system 10 via one or more fasteners. For example, in the illustrated embodiment, bolts may be secured to a series of mount receptacles within the rear cover 62, the lightweight core 52, and the protective shell 50. For example, the rear cover 62 includes a set of three drive mount receptacles 94, the lightweight core 52 includes a set of three drive mount receptacles 96, and the protective shell 50 includes a set of three drive mount receptacles 98. Thus, a set of three bolts may be extended through and/or threaded into the sets of drive mount receptacles 94, 96, and 98, such that the hybrid chuck 12 is secured to the rotary drive 22 or a suitable rotatable part of the rotary drive 22.

FIGS. 5A, 5B, and 5C are top views of an exemplary embodiment of the hybrid chuck 12 as illustrated in FIGS. 1-4, illustrating an open position, an operating position, and a closed position of the jaws 34. In particular, FIG. 5A illustrates the jaws 34 in an open position, wherein the jaws 34 are expanded radially outward from one another and the axis 42 as indicated by arrows 36. In this open position, the work piece 14 may be inserted or removed from a central space 110 between the set of three jaws 34. FIG. 5B illustrates the set of three jaws 34 in an operating position, wherein the jaws 34 are secured about the work piece 14 disposed in the central space 110. FIG. 5C illustrates the jaws 34 in a closed position, wherein the jaws 34 are fully contracted toward one another about the central space 110 as indicated by arrows 36. Thus, as illustrated by FIGS. 5A, 5B, and 5C, the set of jaws 34 may be pivoted inwardly and outwardly relative to one another to grasp or release the work piece 14 along the rotational axis 42.

FIGS. 6A, 6B, and 6C are cross-sectional views of the hybrid chuck 12 taken along line 6A-6A of FIG. 5A, line 6B-6B of FIG. 5B, and line 6C-6C of FIG. 5C. In particular, FIGS. 6A, 6B, and 6C illustrate the internal actuation of the jaws 34 in the open position, the operating position, and the closed position. As generally illustrated in FIGS. 6A, 6B, and 6C, the actuator plate 72 translates along the axis 42 within the actuator support 88 of the lightweight core 52. As a result of this translation, the actuator plate 72 carries each ball joint 78 of the joint assembly 60 lengthwise along each respective angled guide post 80. In turn, the joint assembly 60 rotates at a ball joint 120 disposed about an axis 122. In other words, the actuator plate 72 converts translational motion into radial motion or leverage against the guide posts 80, thereby causing rotation about the axis 122 of the joint assembly 60.

In operation, translation of the actuator plate 72 in a forward direction 124 causes radial expansion of the jaws 34 as indicted by arrows 36 in FIG. 6A. In contrast, translational motion in a reverse direction 126 causes radial contraction of the jaws 34 as indicated by arrows 36 in FIGS. 6B and 6C. In certain embodiments, the translational motion imparted onto the actuator plate 72 may be achieved by an electric drive, a pneumatic drive, a hydraulic drive, or another suitable drive mechanism. For example, as illustrated in FIGS. 6A, 6B, and 6C, a hydraulic fluid may provide a positive or negative pressure within a chamber 128 in a shaft 130 of the actuator plate 72. For example, a hydraulic pump may pump the hydraulic fluid into the chamber 128 to cause the forward translational motion 124, or the hydraulic pump may pump the hydraulic fluid out of the chamber 128 to cause the reverse translational motion 126. Alternatively, a drive may simply provide an external force in the forward direction 124 or the reverse direction 126 to cause movement of the actuator plate 72.

As illustrated in FIGS. 6A, 6B, and 6C, the protective shell 50 and the rear cover 62 at least substantially or completely surround and enclose the lightweight core 52. In other words, the protective shell 50 and the rear cover 62 surround the lightweight core 52 with the exception of the space filled by the joint assemblies 60, bolts in receptacles, and connections with the shaft 130. In this configuration, the protective shell 50 may be made of a high strength, hard, and erosion resistant material, such as high strength and/or stainless steel. In one embodiment, the protective shell 50 is made of AISI 4150 steel pre-heat treated to a hardness of 26-33 on the Rockwell "C" scale. In contrast, the lightweight core 52 may be made of a material characterized as having a lower specific weight, lower density, lower hardness, lower erosion resistance, or a combination thereof, relative to the material of the protective shell 50. For example, the lightweight core 52 may have a lower density and/or specific weight than the protective shell 50, e.g., at least 10, 15, 20, 25, 30, or 40 percent lower. By further example, the protective shell 50 may have a greater hardness than the lightweight core 52, e.g., 5, 10, 15, 20, 25, 30, or 40 percent greater.

For example, the lightweight core 52 may be made of a variety of plastics, including thermoplastics, thermosetting plastics, or engineering plastics. By further example, the lightweight core 52 may be made of an engineering plastic, such as Acrylonitrile butadiene styrene (ABS), Polycarbonates (PC), Polyamides (PA) (Nylons), Polybutylene terephthalate (PBT), Polyethylene terephthalate (PET), Polyphenylene oxide (PPO), Polysulphone (PSU), Polyetherketone (PEK), Polyetheretherketone (PEEK), or Polyimides, or combinations thereof. By further example, the lightweight core 52 may be made of Polytetrafluoroethylene (PTFE) (trade name Teflon), Polyetheretherketone (PEEK) (Polyetherketone), or a combination with of any of the foregoing materials. The lightweight core 52 also may be made of a composite material, which may be defined as an engineered material made from two or more constituent materials that remain separate and distinct on a macroscopic level within the finished structure. For example, a composite material may include a reinforcement material (e.g., particles, fibers, or the like) impregnated in a base material, such as any of the foregoing plastic materials. Examples of fiber reinforced composites include a fiber reinforced polymer (FRP), a carbon-fiber reinforced plastic (CFRP), or a glass reinforced plastic (GRP). In one embodiment, the lightweight core 52 is made of a NEMA Grade G10 glass reinforced epoxy, a G10-FR4 glass reinforced epoxy with fire retardant, a G11-FR5 glass reinforced epoxy with fire retardant, or another suitable composite material.

As discussed further below, the lightweight core 52 may be manufactured and assembled with the protective shell 50 via a variety of techniques, including shrink fitting, injection molding, mechanical fasteners, chemical bonds (e.g., adhesives), or a combination thereof. In one embodiment, the lightweight core 52 may be shrunk (e.g., via cooling or mechanical compression) and/or the protective shell 50 may be expanded (e.g., via heating or mechanical expansion) prior to insertion of the lightweight core 52 into the protective shell 50. In this embodiment, after insertion, the lightweight core 52 may expand and/or the protective shell 50 may contract back toward an original state to create a shrink fit. In another embodiment, a plastic or composite material may be directly injected or poured in liquid form into the interior of the protective shell 50, such that the material solidifies in the shape of the interior of the protective shell 50. In this embodiment, the material may solidify against radial protrusions and other structures to secure the lightweight core 52 in place within the protective shell 50. In another embodiment, an adhesive may be disposed directly between the lightweight core 52 and the protective shell 50. In another embodiment, a plurality of bolts, keys in slots, radial protrusions in grooves, or other mechanical connections may be used to secure the lightweight core 52 in the protective shell 50.

As appreciated, the hybrid chuck 12 is substantially lighter than an all-steel construction. In one embodiment, the hybrid chuck 12 made with a steel protective shell 50 and a plastic core 52, rather than an all-steel construction, may provide a reduction in mass of about 32 percent, e.g., 36.6 pounds for an all steel body 16 versus 25.17 pounds for a hybrid steel/plastic body 16. In other embodiments, if the hybrid chuck 12 includes a rear cover 62 coupled to a steel protective shell 50 and a plastic core 52, then a further weight reduction can be achieved by using a lightweight material (e.g., aluminum) rather than steel for the rear cover 62. For example, an all steel construction may weigh about 51.39 pounds. In one embodiment, a hybrid chuck 12 with a steel protective shell 50, a steel rear cover 62, and a plastic core 52 may weigh about 40.11 pounds, which is about a 22 percent reduction in weight relative to the all-steel construction. In another embodiment, a hybrid chuck 12 with a steel protective shell 50, an aluminum rear cover 62, and a plastic core 52 may weigh about 30.41 pounds, which is about a 41 percent reduction in weight relative to the all-steel construction. Accordingly, various embodiments of the hybrid chuck 12 may be characterized by a percentage reduction in weight of greater than 10, 15, 20, 25, 30, 35, 40, 45, 50, or more.

Along with the weigh reduction discussed above, the hybrid chuck 12 substantially reduces torque requirements for start up and acceleration up to a desired speed. In the following discussion, a comparison is made between torque requirements to accelerate from 0 to 3500 rpm in 5 seconds. In an all-steel construction, the torque requirements are about 335 lbf-in to accelerate the all-steel chuck from 0 to 3500 rpm in 5 seconds. In contrast, an embodiment of a hybrid chuck 12 made with a steel protective shell 50, a plastic core 52, and a steel rear cover 62 may have torque requirements of about 278 lbf-in to accelerate the hybrid chuck 12 from 0 to 3500 rpm in 5 seconds. In this embodiment, the hybrid chuck 12 provides about a 17 percent reduction in torque as compared to the all-steel construction. In another embodiment, a hybrid chuck 12 made with a steel protective shell 50, a plastic core 52, and an aluminum rear cover 62 may have torque requirements of about 241 lbf-in to accelerate the hybrid chuck 12 from 0 to 3500 rpm in 5 seconds. In this embodiment, the hybrid chuck 12 provides about a 28 percent reduction in torque as compared to the all-steel construction. Accordingly, various embodiments of the hybrid chuck 12 may be characterized by a percentage reduction in torque requirements of greater than 10, 15, 20, 25, 30, 35, 40, or more.

FIGS. 7-11 illustrate an embodiment of manufacturing the hybrid chuck 12 as illustrated in FIGS. 1-6 using a shrink fitting technique. FIG. 7 is a rear exploded perspective view of the hybrid chuck 12, illustrating the lightweight core 52 exploded from the protective shell 50. In the illustrated embodiment, the protective shell 50 and the lightweight core 52 both have a generally cylindrical shape. For example, the protective shell 50 has a cylindrical interior 140, and the lightweight core 52 has a corresponding cylindrical exterior 142. However, in the illustrated embodiment, the cylindrical interior 140 has a smaller diameter than the cylindrical exterior 142 at room temperature. The lightweight core 52 may be installed into the protective shell 50 by either expanding the diameter of the cylindrical interior 140 and/or contracting the diameter of the cylindrical exterior 142. In one embodiment, a thermal differential may be used to expand or contract these components to facilitate a shrink fitting of the lightweight core 52 within the protective shell 50. For example, the protective shell 50 may be heated to an elevated temperature, e.g., 200 degree Fahrenheit, such that the diameter of the cylindrical interior 140 becomes greater than the diameter of the cylindrical exterior 142. Alternatively or in combination with this thermal expansion of the protective shell 50, the lightweight core 52 may be contracted by cooling or mechanical compression, such that the diameter of the cylindrical exterior 142 is less than the diameter of the cylindrical interior 140. After sufficient expansion of the protective shell 50 and/or compression of the lightweight core 52, the lightweight core 52 may be inserted into the protective shell 50. After insertion, the protective shell 50 and the lightweight core 52 become shrink fit together as these components tend to return toward their original states.

FIG. 8 is a rear perspective view of the hybrid chuck 12 as illustrated in FIGS. 1-7, further illustrating the lightweight core 52 shrink fit within the protective shell 50. After inserting the lightweight core 52 into the protective shell 50 as discussed above with reference to FIG. 7, the core 52 may expand and/or the shell 50 may contract to create a shrink fit along an annular interface 144 between the cylindrical interior 140 of the protective shell 50 and the cylindrical exterior 142 of the lightweight core 52. As a result, the shrink fit may create a pre-load between the protective shell 50 and the lightweight core 52 along the annular interface 144 as indicated by arrows 146. For example, if the protective shell 50 is heated to provide expansion of the cylindrical interior 140 from a diameter smaller than the cylindrical exterior 142 to a diameter larger than the cylindrical exterior 142, then the subsequent cooling of the protective shell 50 will result in a pre-load 146 due to the natural tendency of the protective shell 50 to shrink toward a smaller diameter than the lightweight core 52. In the illustrated embodiment, the annular interface 144 extends completely around the entire circumference of both the protective shell 50 and the lightweight core 52. Thus, the pre-load 146 provides a continuous force against rotation along the annular interface 144. In certain embodiments, as discussed further below, the annular interface 144 may include a chemical bond, a mechanical connector, or a combination thereof. For example, the annular interface 144 may include a plurality of bolts, keys and slots, radial protrusions, or other features to prevent rotation between the protective shell 50 and the lightweight core 52. By further example, an adhesive, such as epoxy, may extend continuously along the annular interface 144 between the protective shell 50 and the lightweight core 52.

FIG. 9 is a rear prospective view of an embodiment of the hybrid chuck 12 as illustrated in FIGS. 1-8, illustrating machined features in the lightweight core 52 after shrink fitting of the lightweight core 52 within the protective shell 50 as discussed above with reference to FIG. 8. As illustrated, the lightweight core 52 may be machined to include the cloverleaf receptacle 86 of the actuator support 88, the set of six bushing receptacles 90, and the set of three drive mount receptacles 96. As discussed above, the lightweight core 52 may be made from a variety of lightweight materials, such as a plastic, an epoxy, a composite, or a combination thereof. For example, the lightweight core 52 may be made from a glass fiber-reinforced epoxy composite (e.g., NEMA G10-FR4), which has particularly good machinability along with strength and lightweight characteristics. Thus, the lightweight core 52 may be able to provide tight tolerances in the machined features, while also reducing the overall specific weight of the hybrid chuck 12 to improve performance of the system 10.

FIG. 10 is a partially exploded rear perspective view of the embodiment of the hybrid chuck 12 as illustrated in FIGS. 1-9, illustrating the jaws 34, the joint assembly 60, the threaded bushings 70, and the actuator plate 72 assembled with the protective shell 50 and the lightweight core 52. As illustrated, the cloverleaf body 84 of the actuator plate 72 is disposed within the cloverleaf receptacle 86 of the lightweight core 52. The actuator plate 72 supports the ball joints 78 with guide posts 80 within the respective joint receptacles 82, such that the actuator plate 72 can move each ball joint 78 along the respective guide post 80. The rear cover 62 includes a central passage 150 configured to fit about the shaft 130 on the actuator plate 72.

FIG. 11 is a rear perspective view of an embodiment of the hybrid chuck 12 as illustrated in FIGS. 1-10, further illustrating the rear cover 62 coupled to the rear opening 58 of the protective shell 50, thereby completely enclosing the lightweight core 52. As discussed above, the protective shell 50 and the rear cover 62 provide external protection about the lightweight core 52, such that flying metal chips and other debris do not damage the features or functionality of the lightweight core 52. Thus, the protective shell 50 and the rear cover 62 may be made from a variety of metals or sufficiently hard and protective materials, while the lightweight core 52 may be made from lighter materials to reduce weight and improve machinability.

FIG. 12 is a flowchart of an embodiment of a process 160 for manufacturing the hybrid chuck 12 as illustrated in FIGS. 1-11. At block 162, the process 160 includes providing a shell with a receptacle smaller than a core. For example, the process 160 may provide the protective shell 50 with an inner diameter that is smaller than an outer diameter of the lightweight core 52. At block 164, the process 160 may expand the shell relative to the core and insert the core into the receptacle. For example, the process 160 may involve heating the protective shell 50 and/or cooling the lightweight core 152 to provide some clearance between the diameters of the protective shell 50 and the lightweight core 52. In one embodiment, the process 160 may heat the protective shell 50 to 200 degrees Fahrenheit to cause expansion of the protective shell 50 relative to the lightweight core 52. In turn, the clearance provided by the expansion and/or contraction enables insertion of the lightweight core 52 into the protective shell 50. At block 166, the process 160 may shrink the shell relative to the core to pre-load the core within the receptacle. For example, if block 164 involves heating the protective shell 50, then block 166 may involve cooling the protective shell 50. Alternatively, if block 164 involves cooling the lightweight core 52, then block 166 may involve heating or returning the lightweight core 52 to room temperature. Blocks 164 and 166 also may involve mechanical techniques to expand and contract the components rather than using thermal differentials. At block 168, the process 160 may involve machining the interior of the core. For example, as discussed above with reference to FIG. 9, the lightweight core 52 may be machined to incorporate receptacles 86, 90, and 96.

FIGS. 13A, 13B, 13C, and 13D are schematics of an embodiment of a process for manufacturing the hybrid chuck 12 as illustrated in FIGS. 1-12. As illustrated, the core 52 is shrink fit within the shell 50, such that pre-loading is achieved in the final product. FIG. 13A illustrates the lightweight core 52 exploded from the protected shell 50, illustrating an inner diameter 180 of the protective shell 50 relative to an outer diameter 182 of the lightweight core 52. Initially, as illustrated in FIG. 13A, the inner diameter 180 is relatively smaller than the outer diameter 182, as indicated by gap 184. For example, the gap 184 may be about 0.004 inch. Thus, the lightweight core 52 is oversized relative to the protective shell 50.

FIG. 13B illustrates the protective shell 50 relative to the lightweight core 52 after expansion of the protective shell 50 as indicated by arrows 186. For example, as discussed above, the protective shell 50 may be heated to an elevated temperature, e.g., 200 degrees Fahrenheit, thereby causing expansion of the inner diameter 180. As illustrated in FIG. 13B, after thermal expansion, the protective shell 50 has an inner diameter 188 that is substantially larger than the outer diameter 182 of the lightweight core 52. Specifically, the inner diameter 188 may exceed the outer diameter 182 by a gap or clearance 190. For example, the gap 190 may be about 0.002 inch. As a result of the thermal expansion, the lightweight core 52 may be inserted into the protective shell 50 as illustrated by arrow 192.

FIG. 13C illustrates the lightweight core 52 disposed within the protective shell 50 after thermal contraction of the shell 50 about the core 52 as indicated by arrows 194. In particular, after insertion of the lightweight core 52 into the protective shell 50 as illustrated by FIG. 13B, the protective shell 50 may be cooled back to room temperature to cause the thermal contraction back toward the original state of the protective shell 50. However, given that the lightweight core 52 was originally larger than the protective shell 50 as illustrated by FIG. 13A, the protective shell 50 is still inclined to shrink toward the original inner diameter 180 as indicated by gap 196. For example, the gap 196 may be about 0.004 inch. This further inclination to contract results in a pre-load indicated by arrows 194. FIG. 13D illustrates one or more internal features 198 machined into the lightweight core 52 after the shrink fitting of the core 52 within the shell 50.

FIGS. 14A, 14B, and 14C are schematics of an embodiment for manufacturing a composite lightweight core 52 of the hybrid chuck 12 as illustrated in FIGS. 1-13. As illustrated, FIG. 14A illustrates a glass fiber woven fabric 210 being dipped in an epoxy resin 212 within a container 214, as indicated by arrow 216. FIG. 14B illustrates the glass fiber woven fabric 210, after being dipped in the epoxy resin 212, subsequently being stacked one over another with other layers of glass fiber woven fabric 210 dipped in the epoxy resin 212, as indicated by arrow 218. FIG. 14C illustrates the lightweight core 52 made of a plurality of stacked layers of glass fiber woven fabric 210, each dipped in the epoxy resin 212.

FIG. 15 is a schematic of an embodiment for injection molding the lightweight core 52 into the protective shell 50 of the hybrid chuck 12 as illustrated in FIGS. 1-13. As illustrated, the protective shell 50 may be filled with an injection/mold material 230 to create the lightweight core 52 in place within the protective shell 50. In the illustrated embodiment, the protective shell 50 includes a plurality of radial protrusions or ribs 232 (e.g., one type of rotational lock mechanism) configured to block rotational movement of the lightweight core 52 after it solidifies within the protective shell 50. In one embodiment, the injection/mold material 230 may undergo heating to enable injection through tubing 234 and nozzle 236 into the protective shell 50. In another embodiment, the injection/mold material 230 may be injected as room temperature, and may cure by another technique.

FIG. 16 is a schematic of an embodiment utilizing bolts 240 (e.g., another type of rotational lock mechanism) to mechanically secure the protective shell 50 to the lightweight core 52 of the hybrid chuck 12 as illustrated in FIGS. 1-13. In the illustrated embodiment, the bolts 240 are threaded radially into threaded receptacles 242 in the lightweight core 52. For example, the bolts 240 may be arranged at different angular positions about the circumference of the protective shell 50 and the lightweight core 52. In another embodiment, the bolts 240 may be threaded axially into threaded receptacles in the lightweight core 52.

FIG. 17 is a schematic of an embodiment utilizing a set of keys 250 and slots 252 (e.g., another type of rotational lock mechanism) to mechanically secure the protective shell 50 to the lightweight core 52 of the hybrid chuck 12 as illustrated in FIGS. 1-13. In the illustrated embodiment, the keys 250 are located in the slots 252 in both the protective shell 50 and the lightweight core 52. For example, the keys 250 and associated slots 252 may be arranged at different angular positions about the circumference of the protective shell 50 and the lightweight core 52. In another embodiment, the keys 250 may be a part of the protective shell 50, while the slots 252 are a part of the lightweight core 52. Alternatively, in another embodiment, the slots 252 may be a part of the protective shell 50, while the keys 250 are a part of the lightweight core 52.

As discussed in detail above, the hybrid chuck 12 may have a variety of forms, material compositions, and fastening mechanisms. However, in each of these embodiments, the hybrid chuck 12 has a substantial reduction in specific weight and torque requirements as compared with an all-metal (e.g., all-steel) construction. For example, the hybrid chuck 12 made with a metal protective shell 50 and a plastic and/or composite core 52 provides substantial reductions in specific weight and torque requirements, while also maintaining external protection against flying chips via the shell 50 and providing internal strength and machinability via the core 52.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a cutting tool;
   a drive;
   a workpiece chuck rotatable by the drive, wherein the workpiece chuck comprises:
      a body comprising a core disposed in a protective shell, wherein the core comprises a non-metallic material, and the protective shell comprises a metal; and
      a plurality of joint assemblies separately supported in the core of the body, wherein each joint assembly comprises a mount post and a ball joint; and
   a plurality of jaws each coupled to one of the plurality of joint assemblies, wherein the jaws are configured to hold a work piece adjacent the cutting tool, wherein each mount post of the plurality of joint assemblies is coupled to one of the plurality of jaws, and each ball joint of the plurality of joint assemblies is coupled to a common actuator.

2. The system of claim 1, wherein the protective shell is shrink fit about the core.

3. The system of claim 1, wherein the core has a cylindrical exterior, the protective shell has a cylindrical interior, the cylindrical exterior continuously contacts the cylindrical interior, and the protective shell is pre-loaded about the core.

4. The system of claim 1, wherein the protective shell is chemically bonded to the core via an adhesive.

5. The system of claim 1, wherein the core is made of a composite material having a plurality of a reinforcing material coupled together by a matrix material.

6. The system of claim 5, wherein the plurality of reinforcing material comprises a plurality of fibers and the matrix material comprises an epoxy material, and the plurality of fibers are distributed throughout the epoxy material.

7. The system of claim 5, wherein the plurality of reinforcing material comprises a plurality of layers of fiber woven cloth, the matrix material comprises an epoxy material, and the plurality of layers of fiber woven cloth are adhered together via the epoxy material.

8. The system of claim 5, wherein the composite material comprises a fire retardant.

9. The system of claim 1, wherein the common actuator is configured to move in an axial direction to pivot each ball joint to cause radial movement of each jaw of the plurality of jaws.

10. The system of claim 1, wherein the protective shell at least substantially covers an outer side wall of the core.

11. The system of claim 1, wherein the protective shell completely covers an outer side wall of the core.

12. The system of claim 1, wherein the protective shell comprises a side wall and an end wall, the side wall extends about an outer side wall of the core, the end wall extend along an axial end wall of the core, the end wall comprises a plurality of separate openings, and each joint assembly of the plurality of joint assemblies extends through one of the plurality of separate openings.

13. The system of claim 1, wherein the non-metallic material of the core comprises a plastic.

14. The system of claim 1, wherein the non-metallic material of the core comprises an epoxy.

15. The system of claim 1, wherein the core has a density or specific weight that is at least 25 percent less than the protective shell, and the protective shell has a hardness that is at least 25 percent greater than the core.

16. A system, comprising:
a cutting tool;
a drive;
a workpiece chuck rotatable by the drive, wherein the workpiece chuck comprises:
 a body comprising a core disposed in a protective shell, wherein the core is made of a composite material having a plurality of a reinforcing material coupled together by a matrix material, the protective shell is made of a metal, the protective shell has a side wall and an end wall, the side wall extends about an outer side wall of the core, the end wall extend along an axial end wall of the core, and the end wall comprises a plurality of separate openings; and
 a plurality of joint assemblies separately supported in the core of the body, wherein each joint assembly of the plurality of joint assemblies extends through one of the plurality of separate openings in the end wall of the protective shell; and
a plurality of jaws each coupled to one of the plurality of joint assemblies, wherein the jaws are configured to hold a work piece adjacent the cutting tool.

17. The system of claim 16, wherein the protective shell completely covers the outer side wall of the core.

18. The system of claim 16, wherein each joint assembly comprises a mount post and a ball joint, each mount post is coupled to one of the plurality of jaws, and each ball joint is coupled to a common actuator.

19. The system of claim 18, wherein the common actuator is configured to move in an axial direction to pivot each ball joint to cause radial movement of each jaw of the plurality of jaws.

20. A system, comprising:
a cutting tool;
a drive;
a workpiece chuck rotatable by the drive, wherein the workpiece chuck comprises:
 a body comprising a core disposed in a protective shell, wherein the core is made of a composite material having a plurality of a reinforcing material coupled together by a matrix material, the protective shell is made of a metal, the protective shell has a side wall and an end wall, the side wall at least substantially covers an outer side wall of the core, the end wall extend along an axial end wall of the core, and the end wall comprises a plurality of separate openings;
 a plurality of joint assemblies separately supported in the core of the body, wherein each joint assembly of the plurality of joint assemblies extends through one of the plurality of separate openings in the end wall of the protective shell; and
 a common actuator coupled to the plurality of joint assemblies; and
a plurality of jaws each coupled to one of the plurality of joint assemblies, wherein the jaws are configured to hold a work piece adjacent the cutting tool, wherein the common actuator is configured to move the plurality of jaws in a radial direction.

21. The system of claim 20, wherein each joint assembly comprises a mount post and a ball joint, each mount post is coupled to one of the plurality of jaws, and each ball joint is coupled to the common actuator.

22. A system, comprising:
a cutting tool;
a drive;
a workpiece chuck rotatable by the drive, wherein the workpiece chuck comprises:
 a body comprising a core disposed in a protective shell, wherein the core comprises a non-metallic material, and the protective shell comprises a metal, and wherein the protective shell comprises a side wall and an end wall, the side wall extends about an outer side wall of the core, the end wall extends along an axial end wall of the core, and the end wall comprises a plurality of separate openings; and
 a plurality of joint assemblies separately supported in the core of the body, wherein each joint assembly extends through one of the plurality of separate openings of the end wall of the protective shell; and
a plurality of jaws each coupled to one of the plurality of joint assemblies, wherein the jaws are configured to hold a work piece adjacent the cutting tool.

* * * * *